United States Patent
Block et al.

(10) Patent No.: US 7,886,059 B2
(45) Date of Patent: *Feb. 8, 2011

(54) PROCESSING SEQUENCED RECORDS ACROSS MULTIPLE NETWORK CONNECTIONS

(75) Inventors: Timothy Roy Block, Rochester, MN (US); Bob Richard Cernohous, Rochester, MN (US); Steven John Simonson, Rochester, MN (US); John Christian Unterholzner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 201 days.

This patent is subject to a terminal disclaimer.

(21) Appl. No.: 12/049,273

(22) Filed: Mar. 15, 2008

(65) Prior Publication Data

US 2008/0162656 A1 Jul. 3, 2008

Related U.S. Application Data

(63) Continuation of application No. 10/301,055, filed on Nov. 21, 2002, now Pat. No. 7,433,955.

(51) Int. Cl.
*G06F 15/16* (2006.01)

(52) U.S. Cl. ............... 709/227; 709/203; 709/206; 709/205; 709/228; 709/229

(58) Field of Classification Search ........ 709/203, 709/204, 205, 228, 229, 227
See application file for complete search history.

(56) References Cited

U.S. PATENT DOCUMENTS

| 5,619,650 A | 4/1997 | Bach et al. |
| 6,643,259 B1 | 11/2003 | Borella et al. |
| 2002/0049825 A1 | 4/2002 | Jewett et al. |

*Primary Examiner*—Yves Dalencourt
(74) *Attorney, Agent, or Firm*—Martin & Associates, LLC; Derek P. Martin

(57) ABSTRACT

An apparatus and method allows processing sequenced records across multiple network connections. A "logical connection" is defined to include one or more network connections. Each message is assigned a sequence number that allows the messages to be ordered on the other end according to sequence number, regardless of which network connection in the logical connection is used to transfer the message. By defining messages, sequencing those messages, and transferring the messages over multiple network connections, the throughput and performance of networked computer systems are substantially increased.

2 Claims, 21 Drawing Sheets

PROCESSING SEQUENCED RECORDS ACROSS MULTIPLE NETWORK CONNECTIONS

CROSS-REFERENCE TO PARENT APPLICATION

This patent application is related to a patent application of the same title, U.S. Ser. No. 10/301,055 filed on Nov. 21, 2002, which is incorporated herein by reference.

BACKGROUND OF THE INVENTION

1. Technical Field

This invention generally relates to computer systems, and more specifically relates to apparatus and methods for communicating between computer systems on a network.

2. Background Art

Since the dawn of the computer age, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users and software applications to communicate with each other over the network. One network that has become very popular is the Internet.

A network is typically made up of a combination of hardware and software. For example, for two computer systems to communicate over a network, each computer system must have a network interface card (NIC) that is coupled to each other, typically through a router or switch. Once the hardware is in place, a network protocol is selected for communicating between the computer systems. Transmission Control Protocol/Internet Protocol (TCP/IP) is one known network protocol that allows for computer systems to communicate with each other. TCP/IP communicates between computer systems by defining a socket on one computer system that represents a point-to-point connection with a corresponding socket on the other computer system. One computer system may send data to another computer system by writing to its socket that corresponds to the connection between the two. The other computer system then reads the data at the other end from its socket that corresponds to the connection. Once a set of corresponding sockets is defined on two computer systems, the two systems may communicate with each other by writing to and reading from their respective sockets, as described above.

Many different types of computer networks are known in the art. The most dominant form of computer networks in existence today are client-server networks. In a typical client-server network, one or more client computer systems are connected to a network, and one or more server computer systems are coupled to the network. In some client-server networks, the client computer systems are personal computers, while the server computer systems are computer systems that are specialized servers that are optimized for performing the functions of a network server. In general, server computer systems are responsible for performing tasks requested by the client computer systems.

Data transfer from a client computer system to a server computer system is one common task that often needs to be performed. FIG. 2 shows an example of a prior art client-server computer system 200 for sending data from the client applications 210 and 220 on client computer system 202 to the server application 270 on the server computer system 204. A client socket 230 is defined on the client computer system 202, which is coupled to a corresponding server socket 250 on the server computer system 204 via network 245. Sockets 230 and 250 are thus dedicated to communicating between client application 210 and server application 270. In similar fashion, a client socket 240 is defined on the client computer system 202, which is coupled to a corresponding server socket 260 on the server computer system 204 via network 245. Sockets 240 and 260 are thus dedicated to communicating between client application 220 and server application 270.

When the client application 210 has data to send to the server application 270, it writes the data to the client socket 230, which transmits the data via network 245 to server socket 250. The server application 270 may then read the data from the server socket 250. This type of transfer is shown by client application 210 sending data A, B, C and D to client socket 230, which is received by server socket 250 and made available to server application 270. A sample record that includes data A is shown in FIG. 3. In similar fashion, when the client application 220 has data to send to the server application 270, it writes the data to the client socket 240, which transmits the data via network 245 to server socket 260. The server application 270 may then read the data from the server socket 260. This type of transfer is shown by client application 220 sending data V, X, Y and Z to client socket 240, which is received by server socket 260 and made available to server application 270.

In prior art systems such as system 200 shown in FIG. 2, a client application has a single, dedicated socket for communicating with the server application. If a small amount of data needs to be transferred, the data may take only a small portion of the available bandwidth that the socket could support. If a large amount of data needs to be transferred, the data must be serially sent on a single socket, and the time required for the transfer is thus limited by the bandwidth of the single socket. Without a way to use multiple sockets for communicating between a client application and a server application, the computer industry will continue to suffer from the drawbacks of client applications communicating over a single, dedicated socket.

SUMMARY OF THE INVENTION

According to the preferred embodiments, an apparatus and method allows processing sequenced records across multiple network connections. A "logical connection" is defined to include one or more network connections. Each message is assigned a sequence number that allows the messages to be ordered on the other end according to sequence number, regardless of which network connection in the logical connection is used to transfer the message. By defining messages, sequencing those messages, and transferring the messages over multiple network connections, the throughput and performance of networked computer systems are substantially increased.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention relates to network communications between computer systems. For those individuals who are not generally familiar with network communications between computer systems, the Overview section below presents concepts that will help to understand the invention.

1. Overview

Known Network Communications

Figure 2:
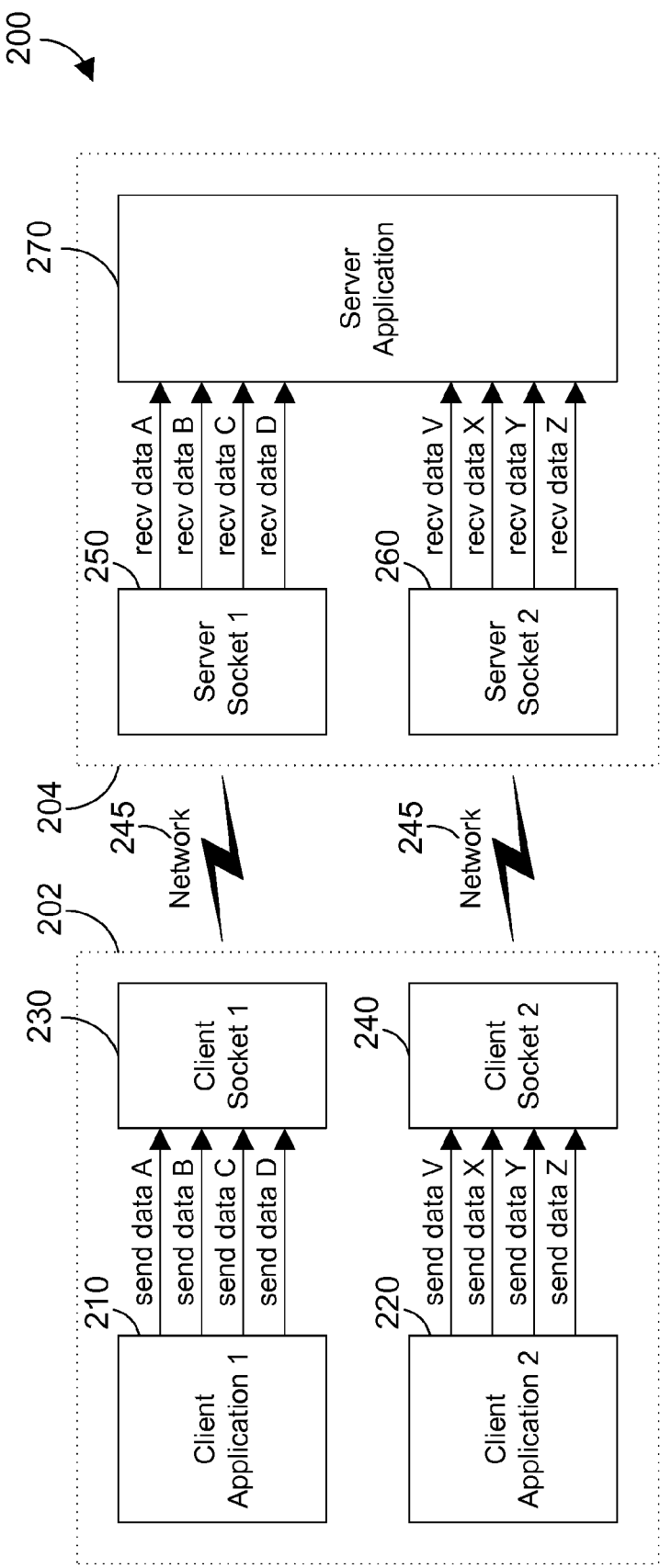
FIG. 2 is a block diagram of a sample prior art networked computer system.

As discussed in the Background section above, FIG. 2 shows a sample prior art system 200 to illustrate network communications in a client-server environment. Client computer system 202 includes two client applications 210 and 220, with corresponding dedicated sockets 230 and 240. The sockets 230 and 240 communicate via network 245 to corresponding sockets 250 and 260 on the server computer system 204, and server application 270 receives the incoming data from the sockets 250 and 260.

Figure 3:
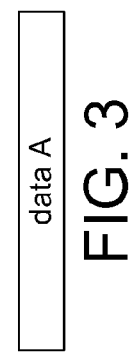
FIG. 3 is a block diagram of data sent in the sample networked computer system of FIG. 2.

There are several drawbacks to the prior art system 200 illustrated in FIG. 2. First, each client application is dedicated to a single client socket. If a client application has large amounts of data to send, it must do so on a single socket. Second, server application 270 directly services the server sockets 250 and 260. At the TCP transport layer, data (such as data A shown in FIG. 3), may be broken down into multiple packets for transmission over network 245. In prior art system 200, the server sockets 250 and 260 may notify the server application 270 each time a packet is received. The server application 270 thus may interact with the server sockets 250 and 260 for each packet of information received. This adds significant processing overhead to server application 270.

Record Based I/O on Top of Streaming Protocols

Figure 4:
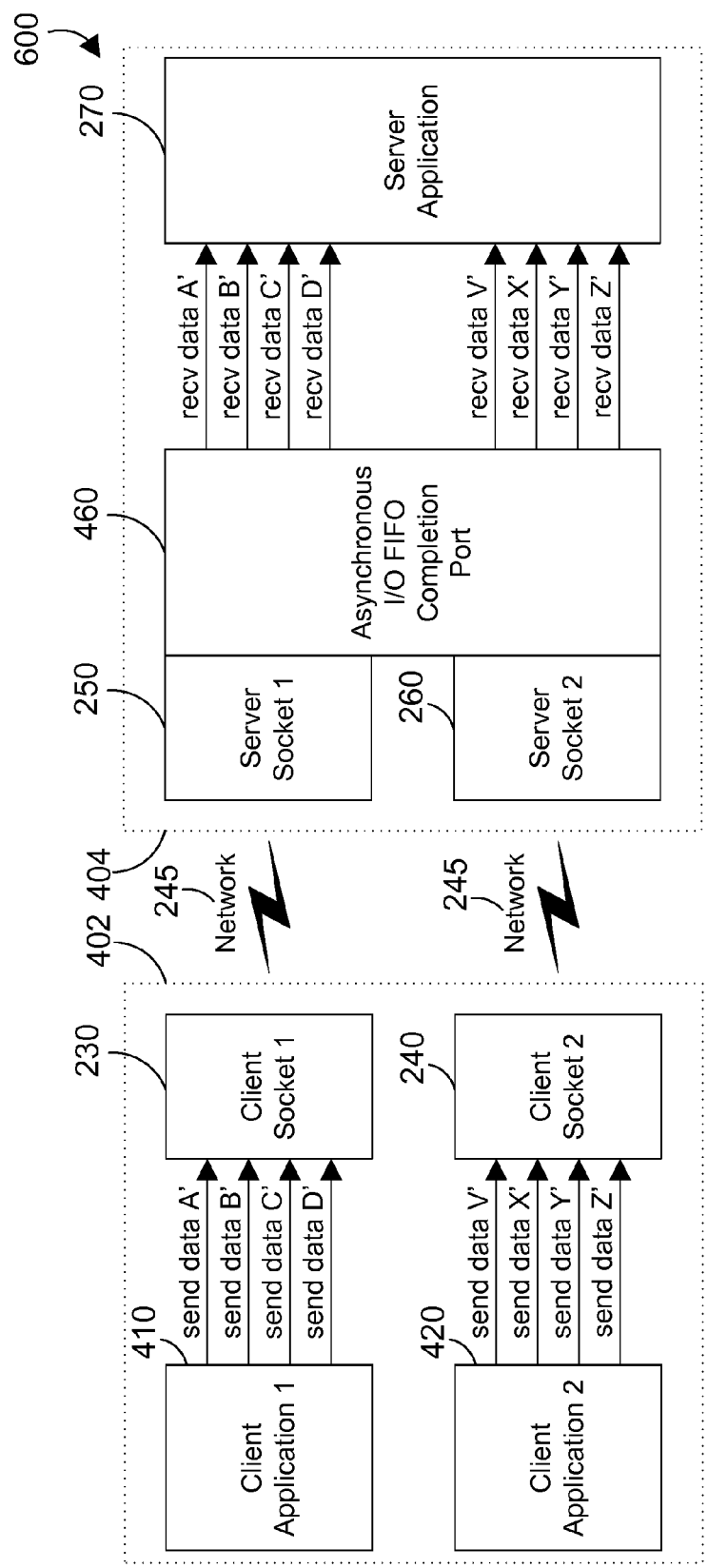
FIG. 4 is a block diagram of another networked computer system.
Figure 5:
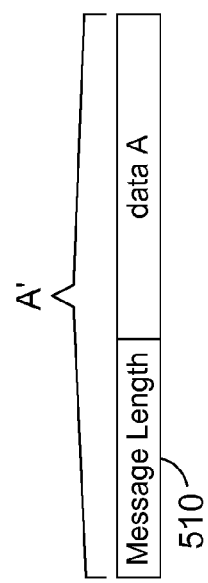
FIG. 5 is a block diagram of data sent in the networked computer system of FIG. 4.

The related application Ser. No. 09/990,850 filed on Nov. 21, 2001, discloses an improvement over the prior art system 200 of FIG. 2, and is shown as system 400 of FIG. 4. An asynchronous I/O first-in-first-out (FIFO) completion port 460 is provided in the server computer system 270 that relieves the server application 270 of the overhead of directly servicing each packet received by the server sockets 250 and 260. When data (such as data A) needs to be sent, a header 510 indicating the length of the message is prepended to the data, resulting in a data record A', as shown in FIG. 5. The data record A' is sent to the client's dedicated socket 230, which transmits the data record A' via network 245 to the corresponding server socket 250. As discussed above, the data record A' may be split into multiple packets for transmission over the network 245. Socket 250 receives data packets, reads and interprets the message length header of a record, assembles packets until the record has been fully received, and delivers complete records (such as A') to the asynchronous I/O FIFO completion port 460. Server application 270 then reads the complete records from asynchronous I/O FIFO completion port 460. Note that the scheme shown in FIG. 4 requires that client applications 410 and 420 and server application 270 have additional logic to send a data record A' that includes a message length header 510 (as shown in FIG. 5) instead of merely transmitting and receiving data A.

While the computer system 400 improves network communications by relieving the server application of the overhead of servicing server sockets, there is still a significant problem that exists when large amounts of data need to be transferred. Because only a single socket may service a client application, the transfer of a large block of data is throughput-limited by the bandwidth of the single socket.

2. Detailed Description

The preferred embodiments enhance the performance of network communications by allowing a "logical connection" to be defined that may include multiple sockets. Data records may be sent via a logical connection that includes multiple sockets, and the received data is correctly reconstructed on the other end. By defining logical connections that include multiple sockets, the time required to transmit a large amount of data may be significantly reduced, thereby increasing system performance.

Figure 1:
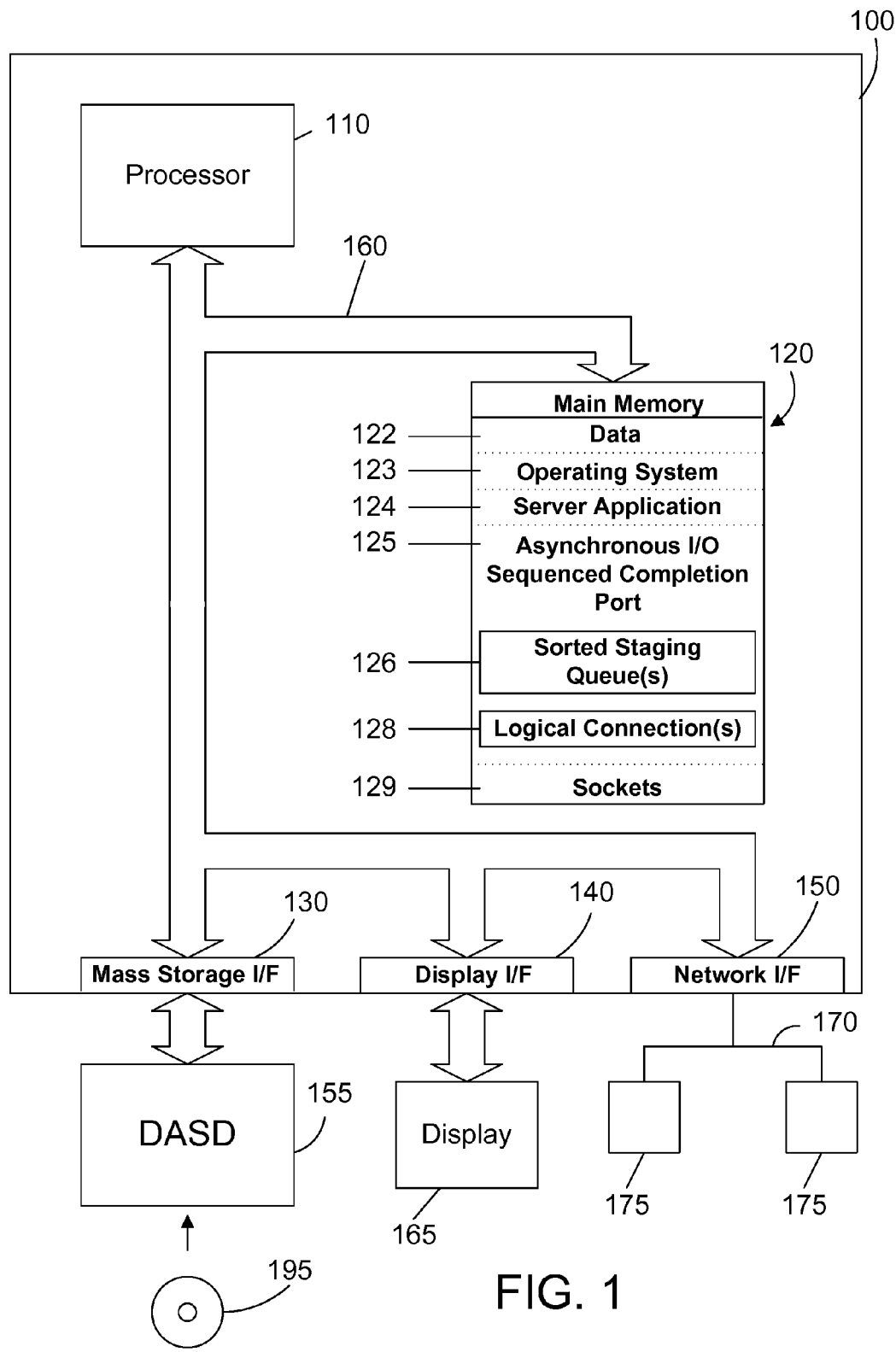
FIG. 1 is a block diagram of an apparatus in accordance with the preferred embodiments.

Referring now to FIG. 1, a computer system 100 is one suitable implementation of a server computer system in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD-RW drive, which may store data to and read data from a CD-RW 195.

Main memory 120 in accordance with the preferred embodiments contains data 122, an operating system 123, a server application 124, an asynchronous I/O sequenced completion port 125 (hereinafter referred to as AIOSCP 125), and one or more sockets 129. AIOSCP 125 preferably includes one or more sorted staging queues 126 and one or more defined logical connections 128. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, server application 124, AIOSCP 125, and sockets 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. Server application 124 is preferably known server application software, but expressly extends to any computer program that needs to receive data. Sockets 129 and AIOSCP 125 (hereafter referred to as AIOSCP 125 for simplicity) process incoming messages, potentially across multiple logical connections, and order the data correctly before notifying the server application 124 that one or more complete messages are ready to be read. AIOSCP 125 suitably includes one or more sorted staging queues 126, which order messages in their proper sequence regardless of the sequence received. Note, however, that sorted staging queues 126 may be separate from the AIOSCP 125 within the scope of the preferred embodiments, as shown in FIGS. 9-22. The definition of one or more logical connections 128 tell the AIOSCP 125 how to construct and sequence incoming messages. The operation of the AIOSCP 125 with its respective elements 126 and 128 is explained in detail below with reference to FIGS. 9-22.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol. In the preferred embodiments, multiple clients are coupled to network 170, and server computer system 100 services requests from these clients.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD-RW (e.g., 195 of FIG. 1), and transmission type media such as digital and analog communications links.

Figure 6:
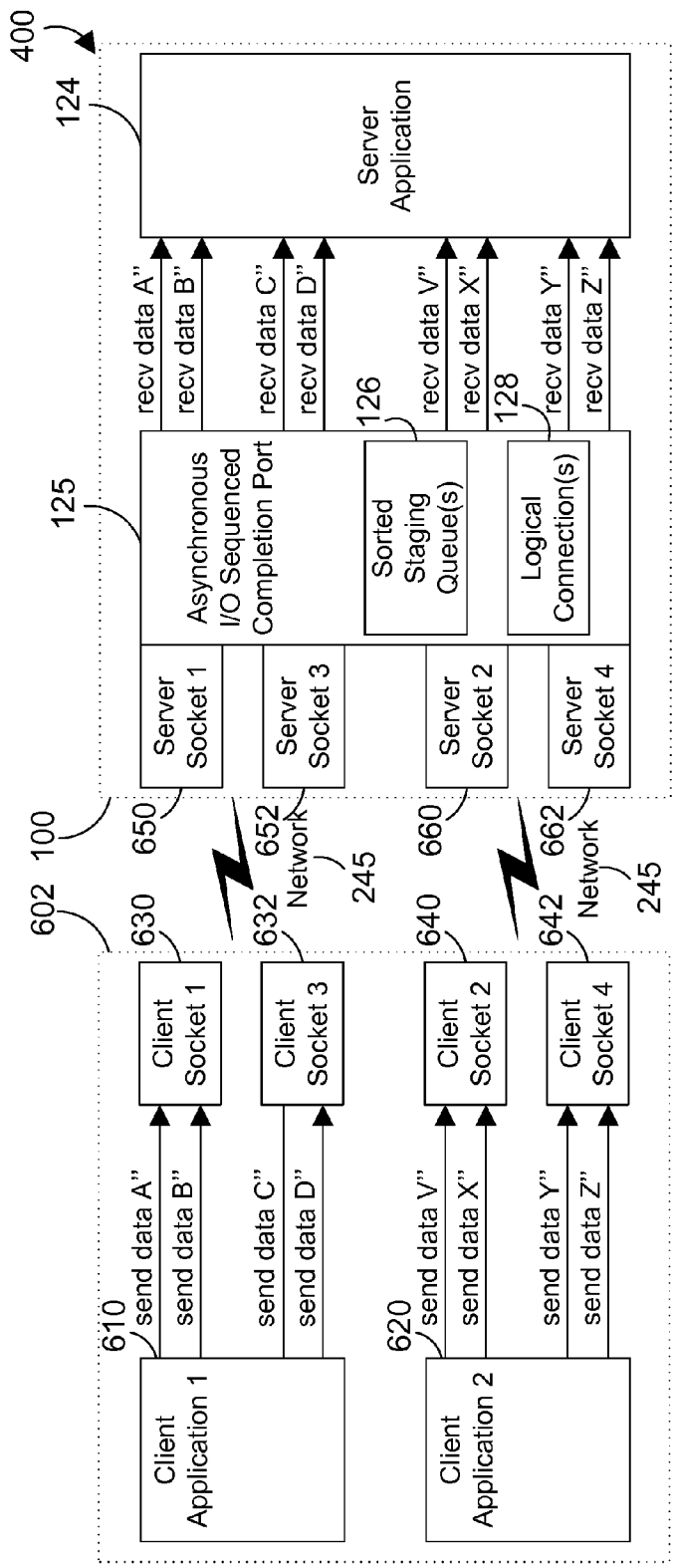
FIG. 6 is a block diagram of a networked computer system in accordance with the preferred embodiments.
Figure 8:
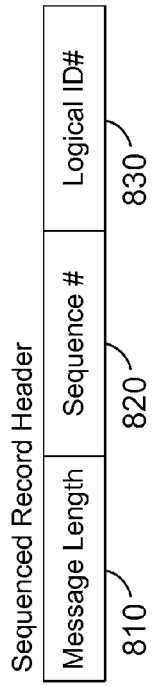
FIG. 8 is a block diagram of the sequenced record header shown in FIG. 7.
Figure 7:
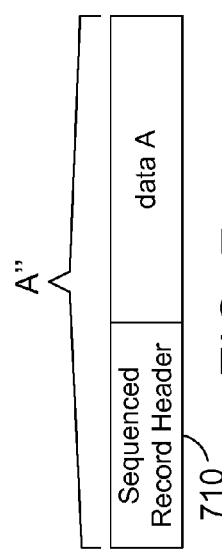
FIG. 7 is a block diagram of data sent in the networked computer system of FIG. 6.

Referring now to FIG. 6, a networked computer system 600 in accordance with the preferred embodiments includes a client computer system 602 coupled via network 245 to server computer system 100. Client computer system 602 includes a first client application 610 that sends data via sockets 630 and 632 to server computer system 100. These two sockets 630 and 632 preferably are part of a first "logical connection." In similar fashion, client computer system 602 includes a second client application 620 that sends data via sockets 640 and 642 to server computer system 100. These two sockets 640 and 642 are preferably part of a second logical connection. Note that data sent by client applications 610 and 620 preferably includes a sequenced record header 710, as shown in FIG. 7. Sequenced record header 710 preferably includes a message length 810, a sequence number 820, and a logical identifier (ID) number 830, as shown in FIG. 8. Because the data transmitted by the preferred embodiments differs from the data transmitted in FIGS. 2 and 4 by the addition of new header information, the data shown in FIG. 8 is A"-D" and V"-Z". By prepending the data with a sequenced record header that includes the length of the message, the sequence number of the record, and the logical ID# corresponding to the record, a client may send messages asynchronously across multiple network connections knowing that the messages will be properly sorted out on the receiving computer system using the information in the sequenced record header 710.

In an alternative embodiment that assumes a single logical connection, the sequenced record header 710 may not include the logical ID# 830 shown in FIG. 8. The logical ID can be implied by either assuming that all records received on these sockets are logically the same based on the assumption of a single logical connection, or by an application-level protocol defining a set of sockets to use for a logical connection. The sequenced record header 710 in FIG. 8 is the more general case that will work for both a single logical connection and for multiple logical connections.

Client sockets 630, 632, 640 and 642 are coupled via network 245 to respective server sockets 650, 652, 660 and 662. AIOSCP 125 is coupled to the server sockets 650, 652, 660 and 662, as shown in FIG. 6. AIOSCP 125 includes one or more sorted staging queues 126, and one or more logical connections 128. We assume for this example that a first logical connection includes client sockets 630 and 632 and corresponding server sockets 650 and 652. A second logical connection includes client sockets 640 and 642 and corresponding server sockets 660 and 662. One of the significant advantages of the preferred embodiments when compared with the prior art is the ability to define multiple sockets as a single "logical connection", thereby drastically improving the speed of transmitting a large data record.

In the specific configuration shown in FIG. 6, the client applications 610 and 620 must know the configuration of logical connections and their corresponding sockets. The client applications must then add appropriate sequenced record headers 710 to each data message to be sent, and must determine which data records to send to which sockets.

Figure 9:
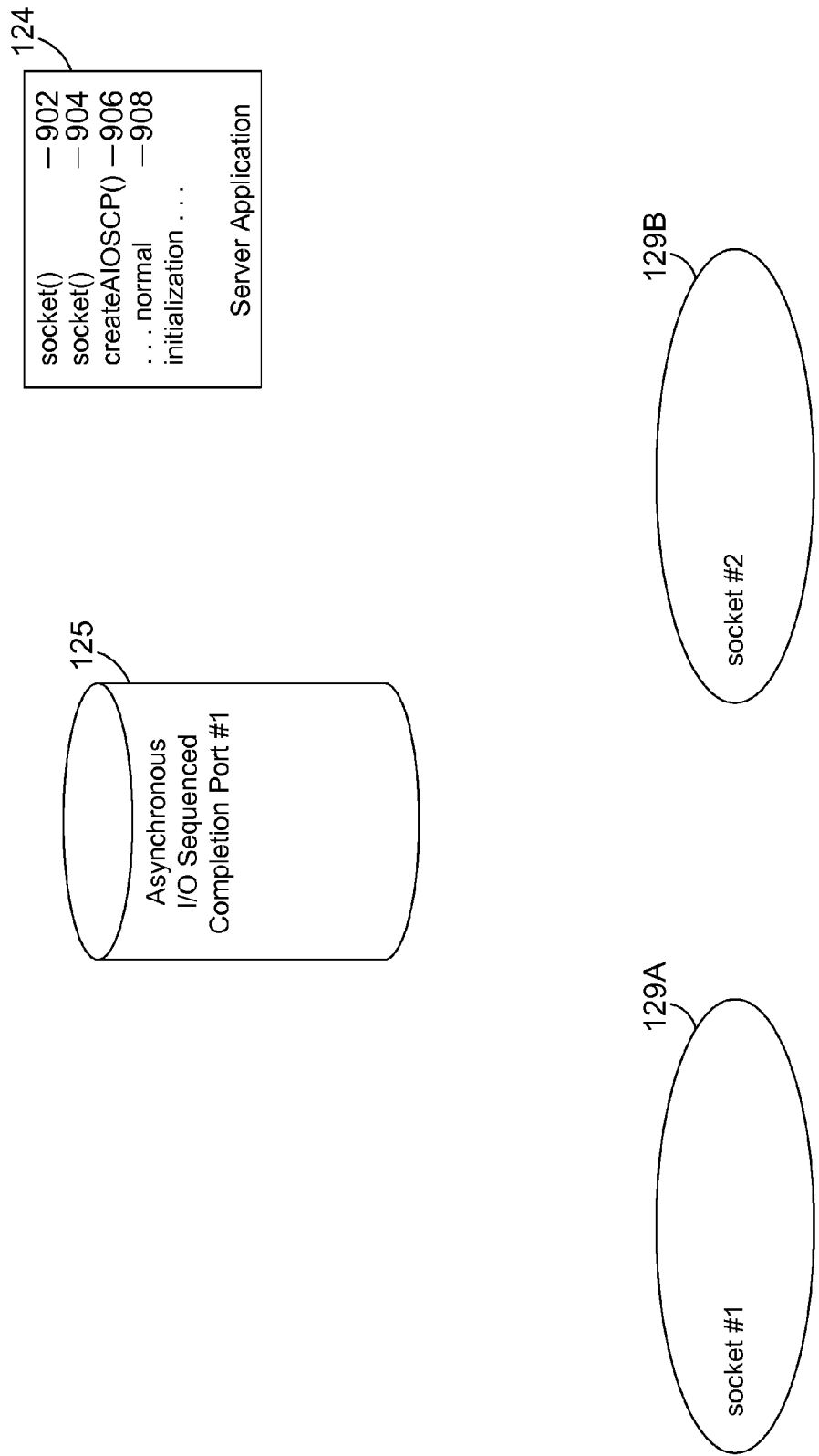
FIGS. 9-18 each show different stages of network communications for one specific example in accordance with the preferred embodiments.

FIGS. 9-22 illustrate various steps that may be performed within the scope of the preferred embodiments to illustrate the principles of the present invention. Referring to FIG. 9, we assume that the code shown in server application 124 is executed. The two socket( ) instructions at lines 902 and 904 create socket 129A and 129B shown in FIG. 9. The createAIOSCPO instruction at line 906 creates the asynchronous I/O sequenced completion port (AIOSCP) 125. Once sockets 129A and 129B and AIOSCP 125 have been created, they are then initialized at line 908.

Figure 10:
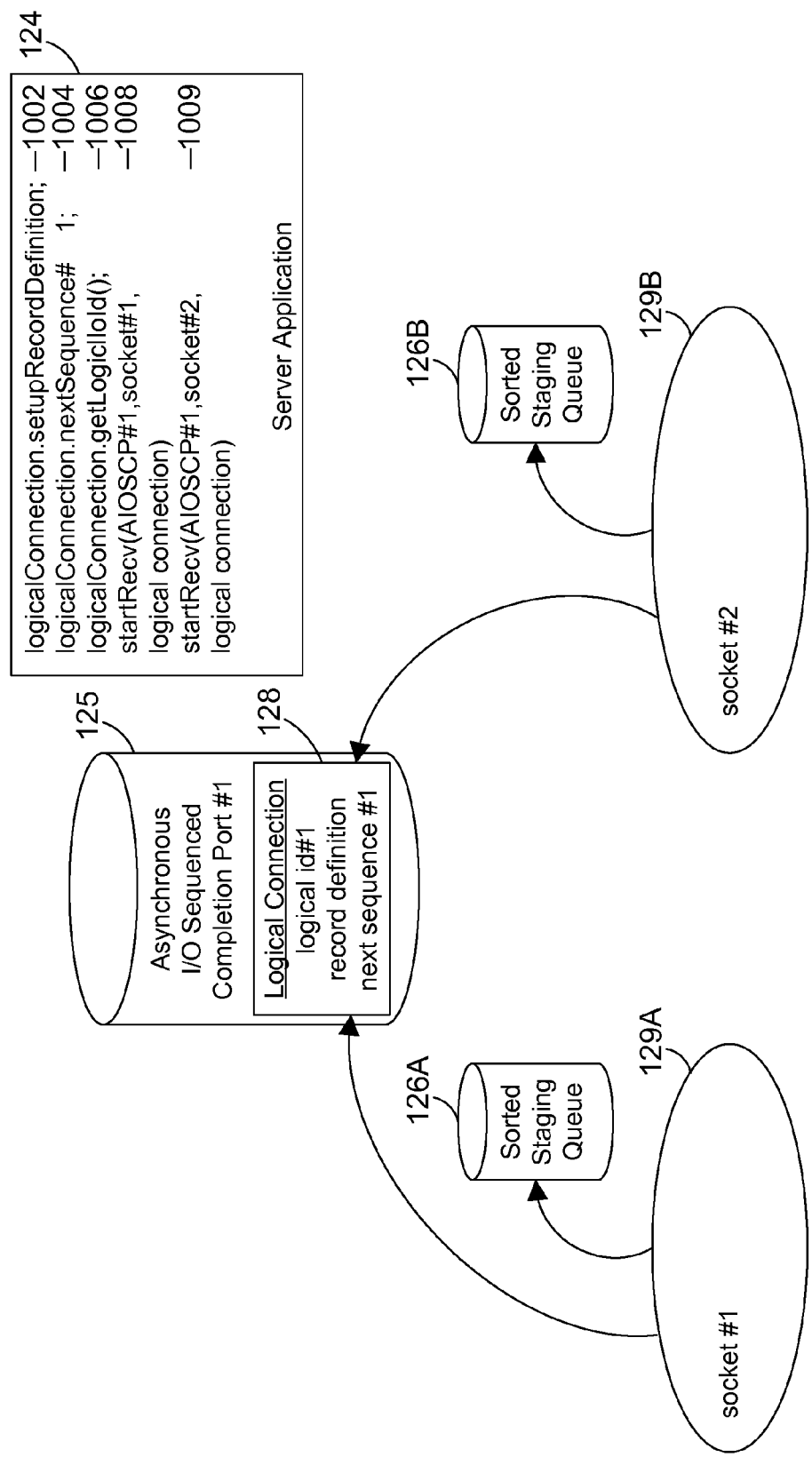

Referring now to FIG. 10, the code in server application 124 is now executed. The record definition is setup at line 1002. The record definition defines the placement and location of the information in the sequenced record header 710. The next sequence number is then initialized to one in each of 129A, 129B and 125 at line 1004. An implied logical ID is then retrieved from AIOSCP 125 at line 1006. This assumes that logical IDs may be implied, which eliminates the need for a logical ID as part of the header information, as discussed above as an alternative embodiment with reference to FIG. 8. For the header as shown in FIG. 8 that includes an explicit logical ID 830, the instruction at line 1006 would be replaced by an instruction that sets the logical ID.

The startRecv( ) instruction at line 1008 creates the sorted staging queue 126A that corresponds to socket 129A, and enables the socket 129A, the sorted staging queue 126A, and the AIOSCP 125 to begin receiving. The passed parameters in the instruction at line 1008 specify that AIOSCP#1 (125) is the completion port, specify that the specified completion port will service socket #1 (129A), and specify that socket #1 (129A) is part of the logical connection corresponding to the defined connection. This instruction at line 1008 causes the logical connection 128 to be written to AIOSCP 125. In similar fashion, the startRecv( ) instruction at line 1009 creates the sorted staging queue 126B that corresponds to socket 129B, and enables the socket 129A, the sorted staging queue 126A, and the AIOSCP 125 to begin receiving. The passed parameters in the instruction at line 1009 specify that AIOSCP#1 (125) is the completion port, specify that the specified completion port will service socket #2 (129B), and specify that socket #2 (129B) is part of the logical connection corresponding to the defined connection. In this specific example, note that two sockets 129A and 129B have been assigned to the same logical connection. A significant advantage of the preferred embodiments is the ability to define multiple network connections (e.g., sockets) as part of a single logical connection, thereby improving the speed of transferring large data records.

Figure 11:
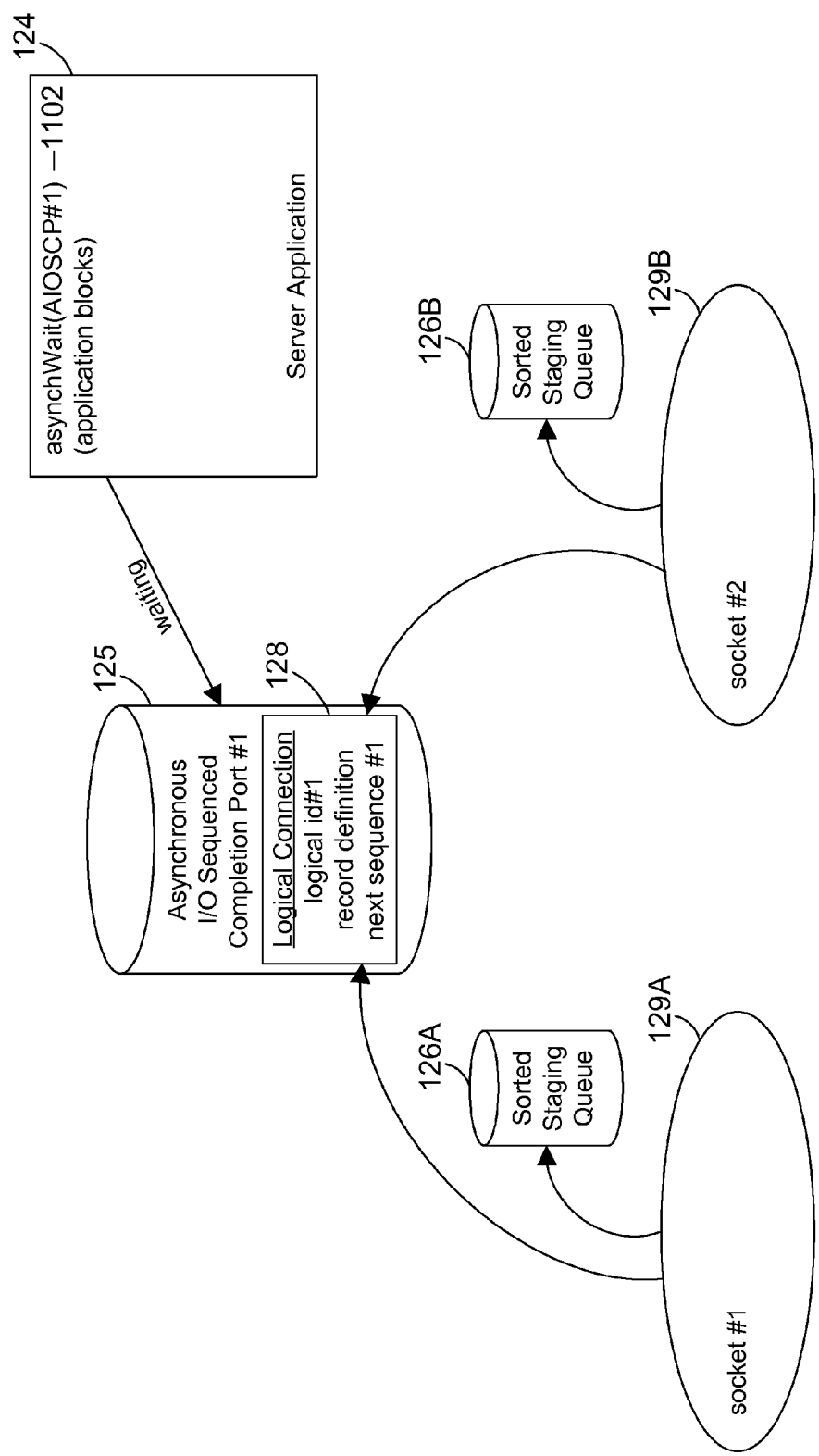

Once the startRecv( ) instructions at lines 1008 and 1009 have been executed, the receiving of records by the sockets 129A and 129B may commence. Referring to FIG. 11, the code in server application 124 is now executed. An instruction asynchwait( ) is executed at line 1102 that specifies that the AIOSCP 125 may begin its function to assemble sequenced records into the appropriate order while the server application 124 waits.

Figure 12:
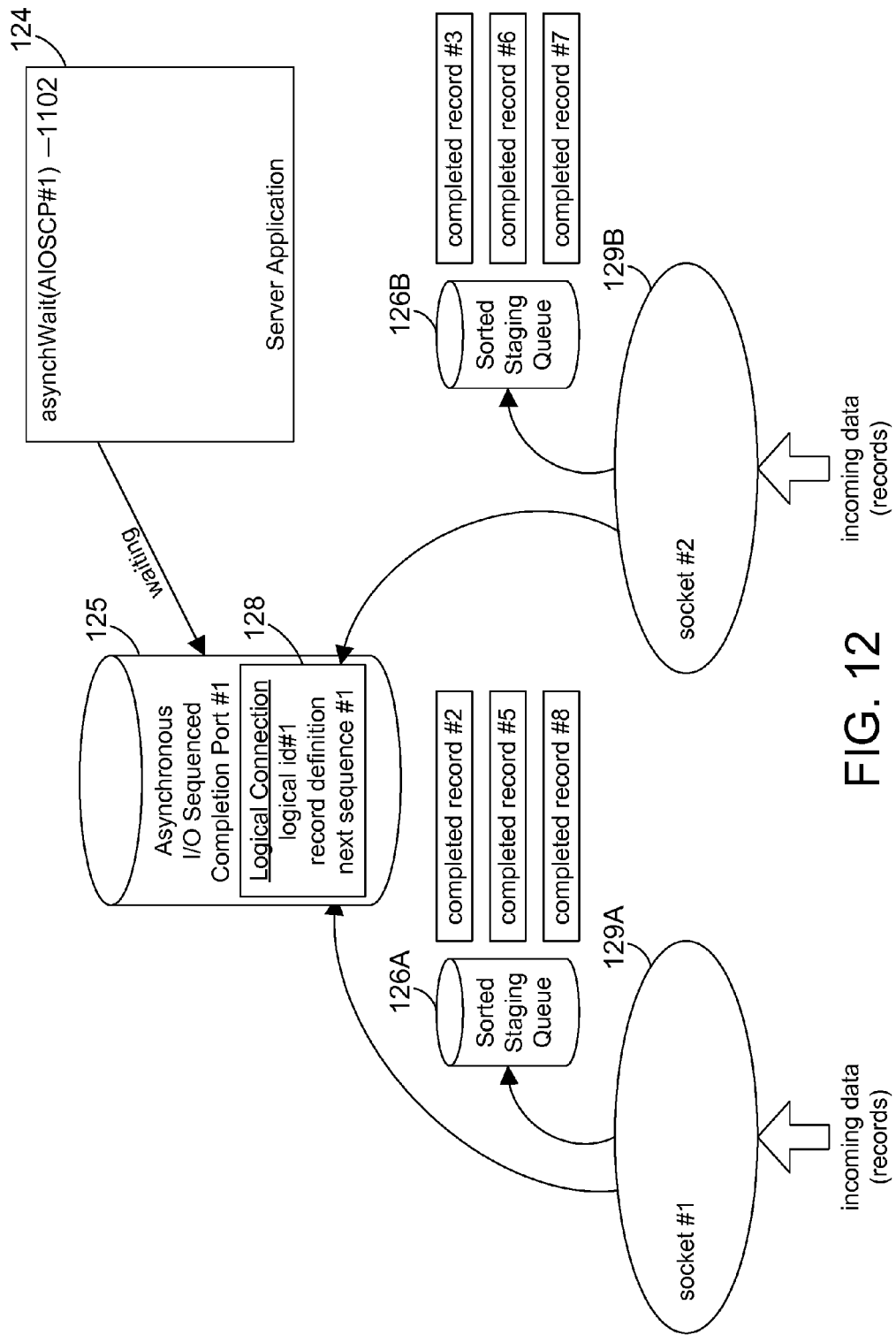

FIG. 12 shows that data records are now being received by the two sockets 129A and 129B. We assume that records #2, #5 and #8 have been completely received via socket 129A, and thus reside on the sorted staging queue 126A in order, with the record numbers corresponding to a sequence number for each record. We also assume that records #3, #6 and #7 have been completely received via socket 129B, and thus reside on the sorted staging queue 126B in order, with the record numbers corresponding to the sequence number for each record. Note that the AIOSCP 125 still has the next sequence number set to #1, and record #1 has not yet been received, so none of the completed records are transferred to the AIOSCP 125 in FIG. 12.

Figure 13:
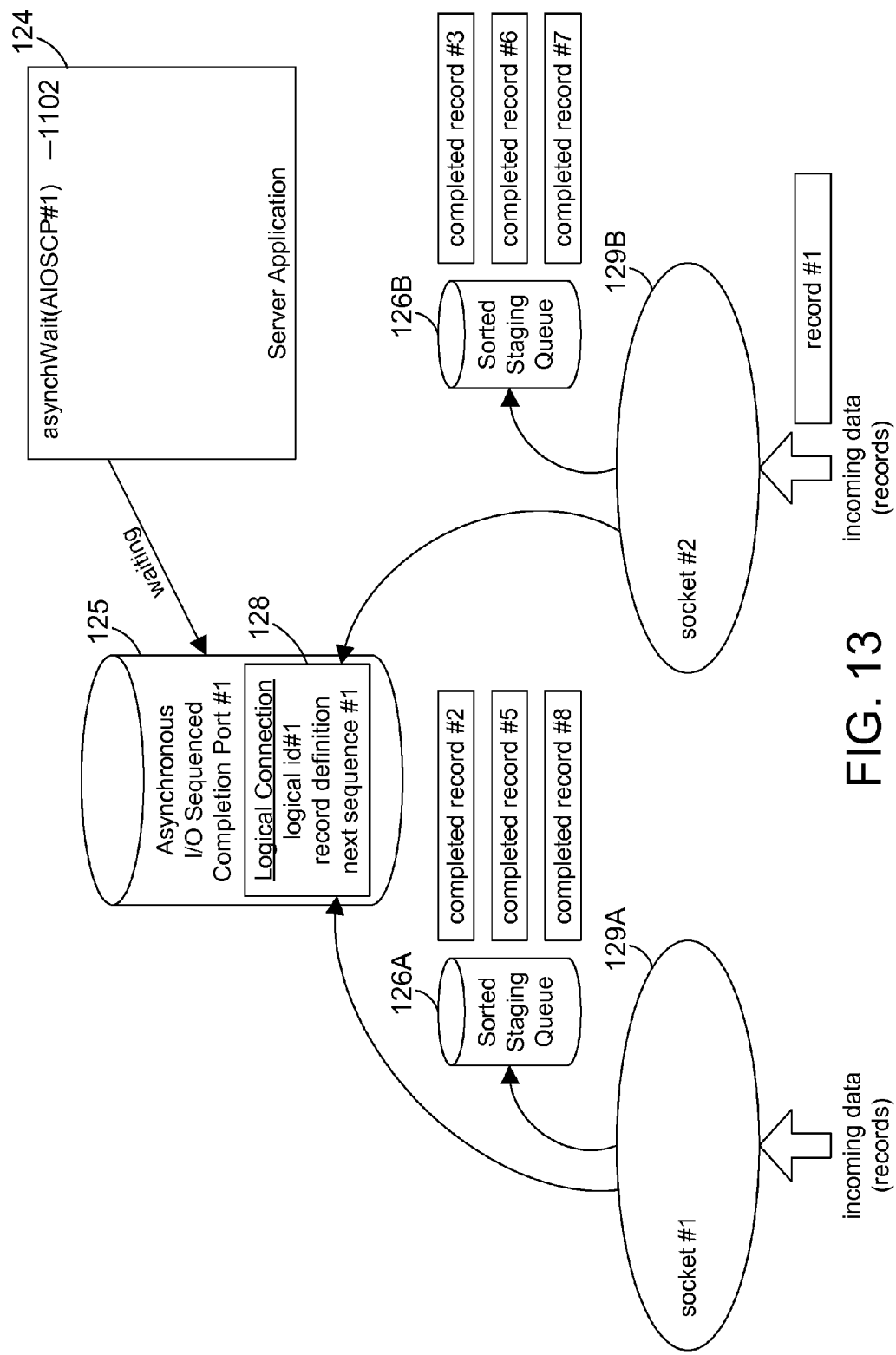
Figure 14:
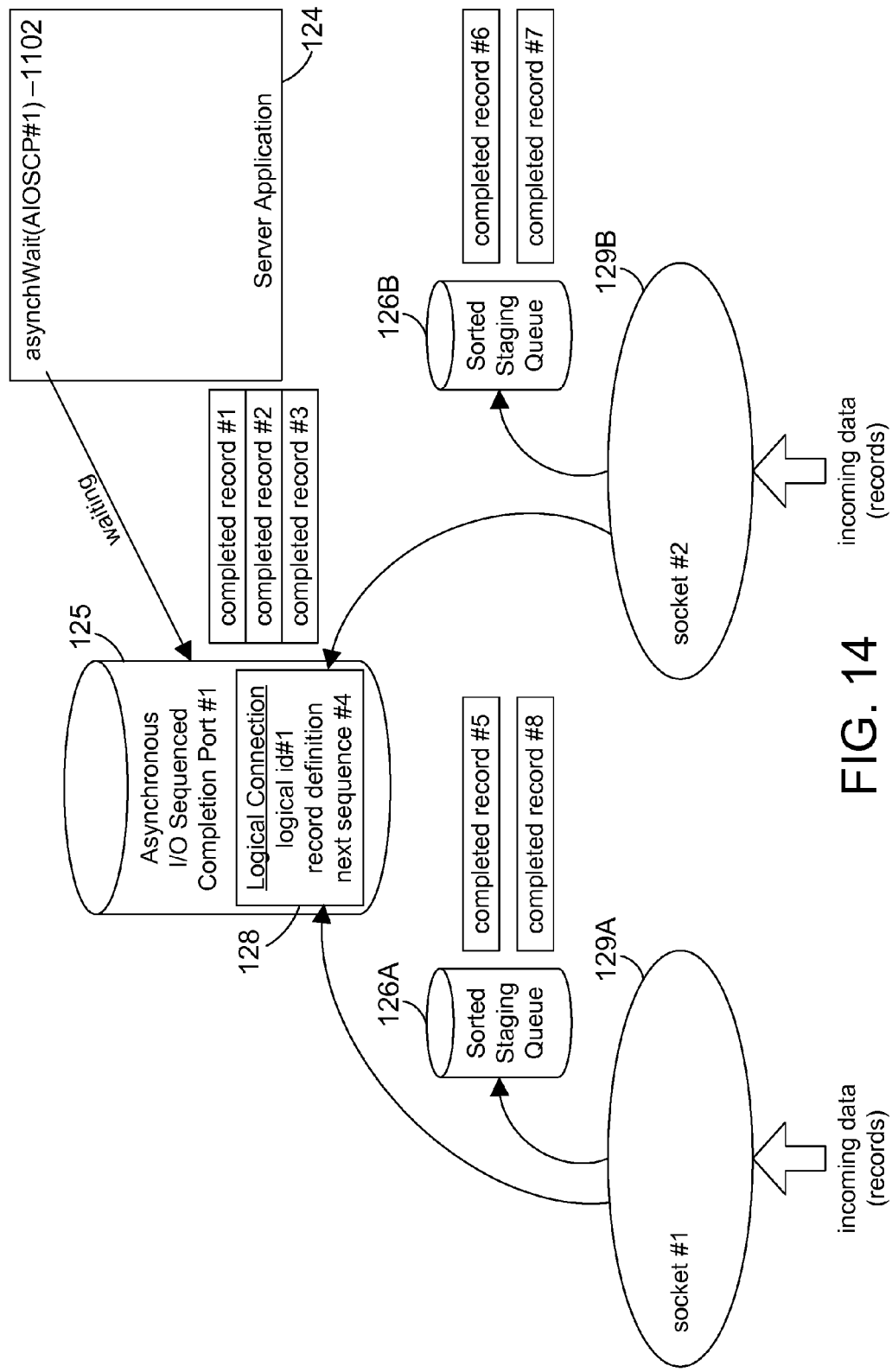
Figure 15:
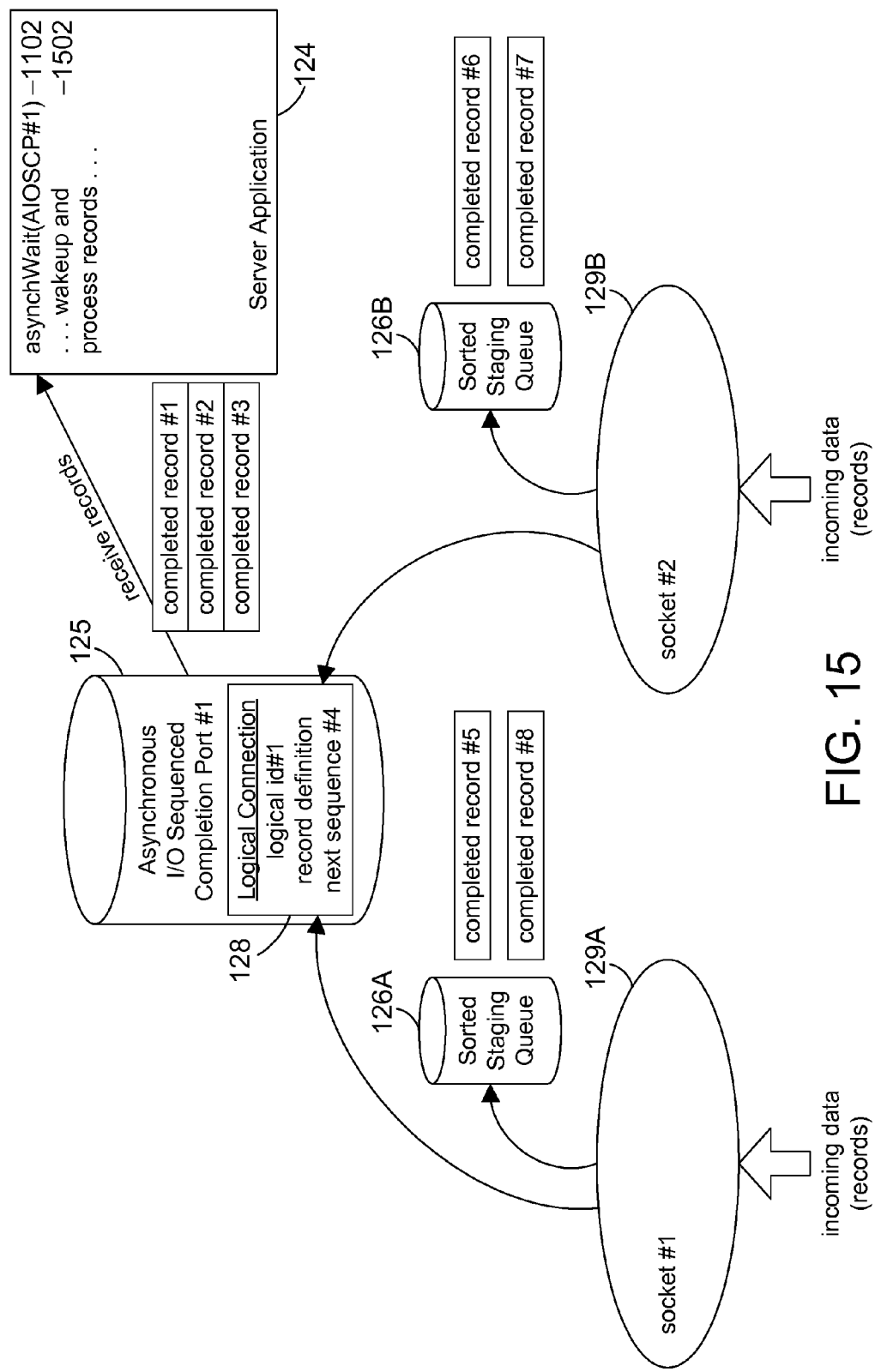

We now assume that record #1 is received on socket 129B, as shown in FIG. 13. Because #1 is the next sequence number in AIOSCP 125, the completed record #1 is transferred to the AIOSCP 125. At this point the next sequence number expected by the AIOSCP 125 is #2, which is already present on the sorted staging queue 126A, so completed record #2 is transferred to the AIOSCP 125. The next sequence number expected by the AIOSCP 125 is #3, which is already present on the sorted staging queue 126B, so completed record #3 is transferred to the AIOSCP 125. At this point the next sequence number expected by AIOSCP 125 is #4, which has not yet been received by either socket, and is therefore not present on either sorted staging queue 126A and 126B. The result is shown in FIG. 14, where the completed records #1, #2 and #3 have been written in sequence to the AIOSCP 125. At this point the AIOSCP 125 signals server application 124 that it has records to transfer. The server application 124 then wakes up and receives the completed records #1, #2 and #3, as shown at line 1502 in FIG. 15.

Figure 16:
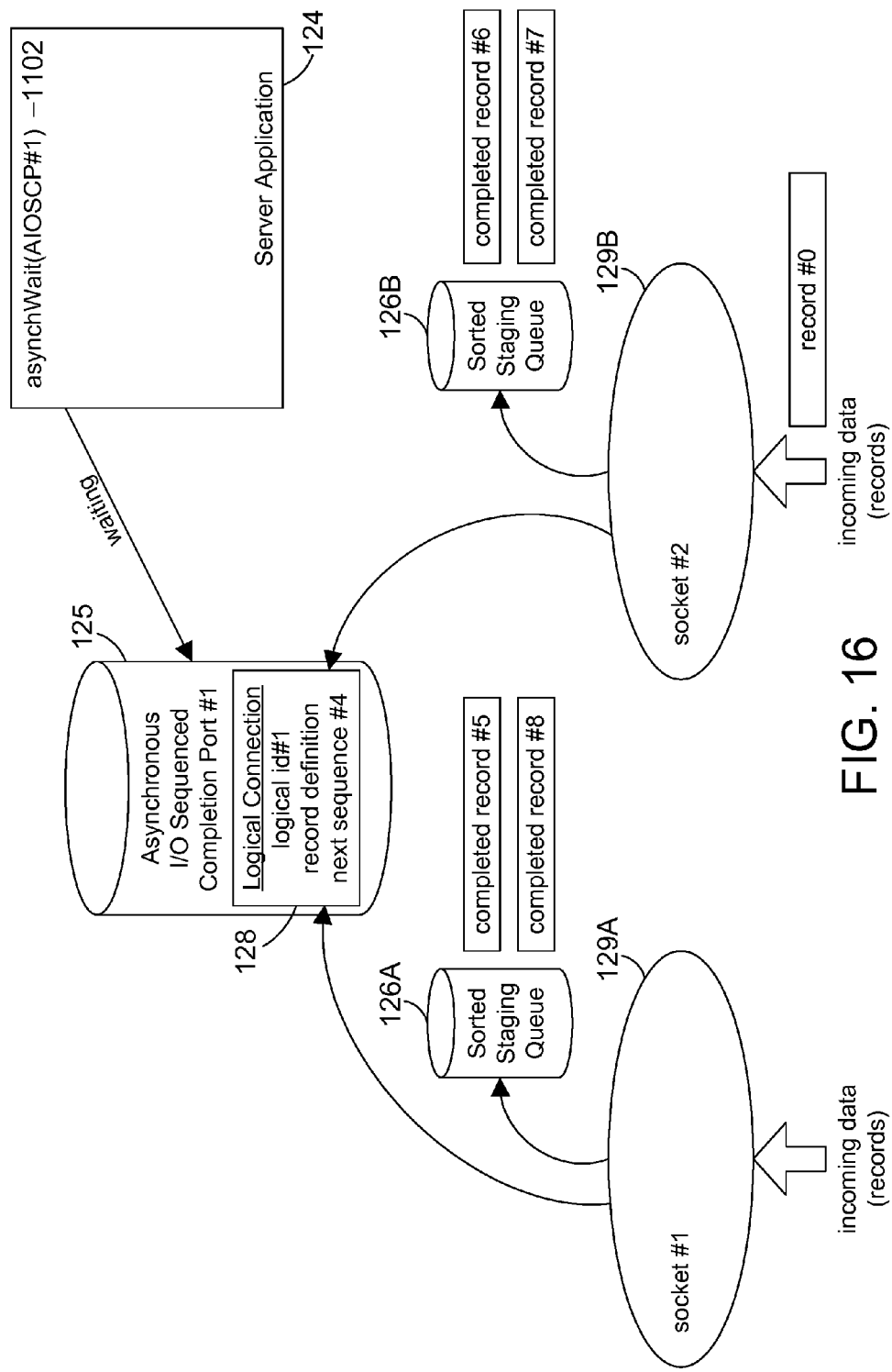
Figure 17:
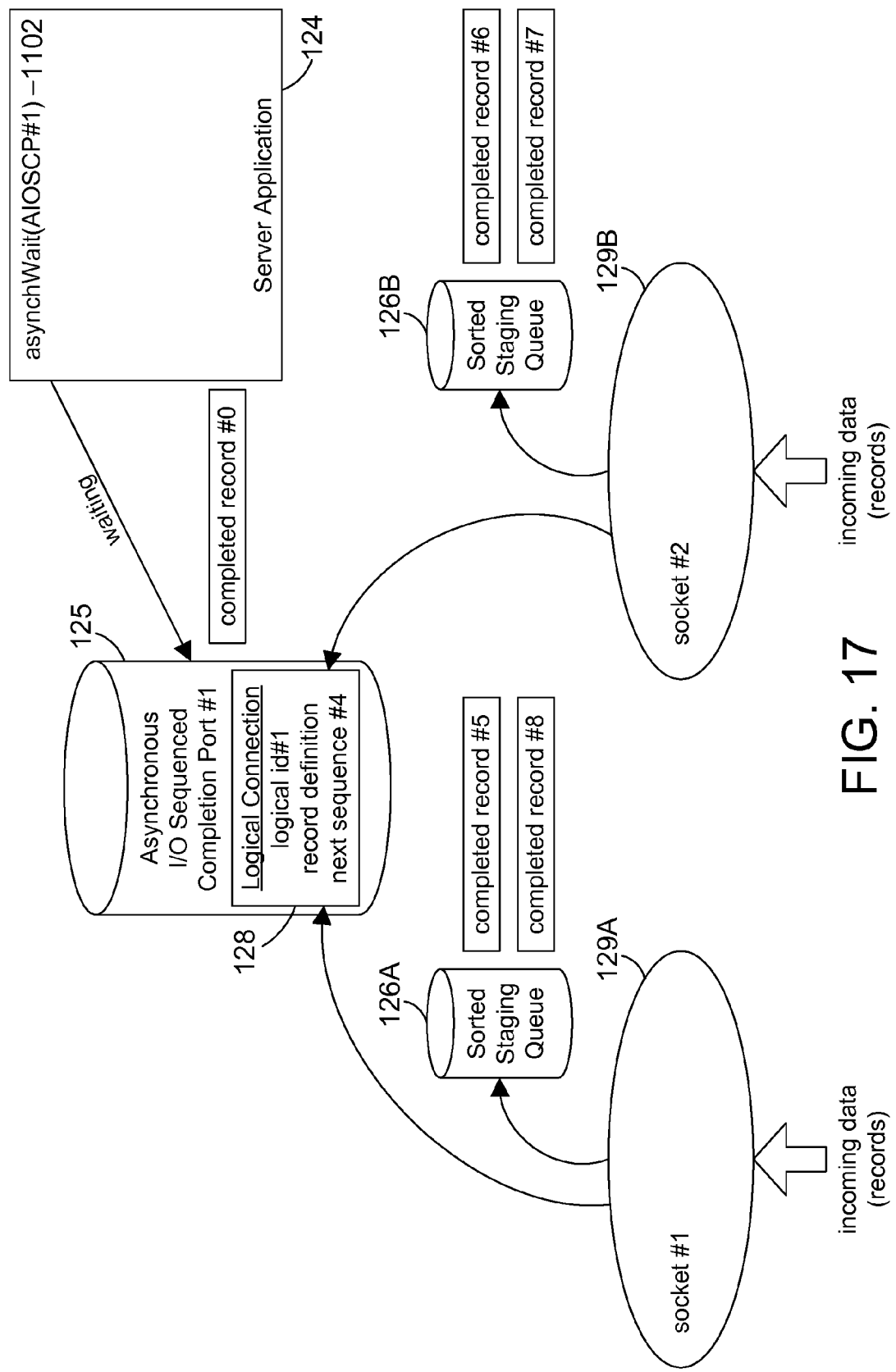
Figure 18:
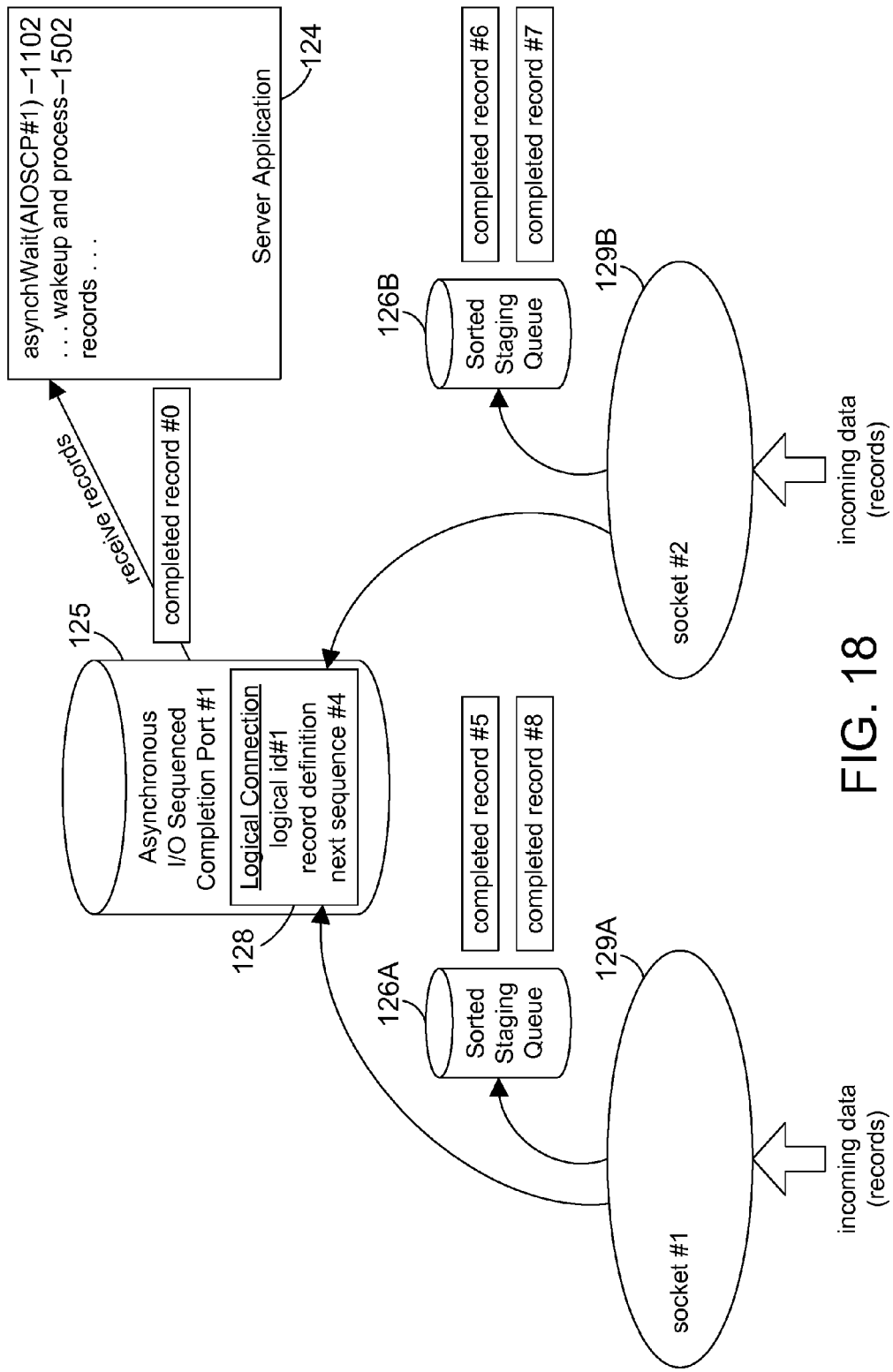

One significant feature of the preferred embodiments is the ability to receive a priority message out of order so it may be received as soon as possible by the server application. In the preferred embodiments, a sequence number of zero is treated as a priority message that will be passed directly to the server application as quickly as possible. Referring to FIG. 16, record #0 is received on socket 129B. Once the entire record #0 is received by socket 129B, completed record #0 is transferred to AIOSCP 125, as shown in FIG. 17. AIOSCP 125 then wakes up the server application 124, which receives the completed record #0 from AIOSCP 125, shown in FIG. 18. FIGS. 16-18 illustrate that a priority record may bypass the normal sequenced processing of records to result in the priority record being delivered to the server application 124 as quickly as possible. In the simple example of FIGS. 16-18, a priority record is given a sequence number of zero. However, the preferred embodiments expressly extend to any manner of distinguishing a priority record from a sequenced record.

Figure 19:
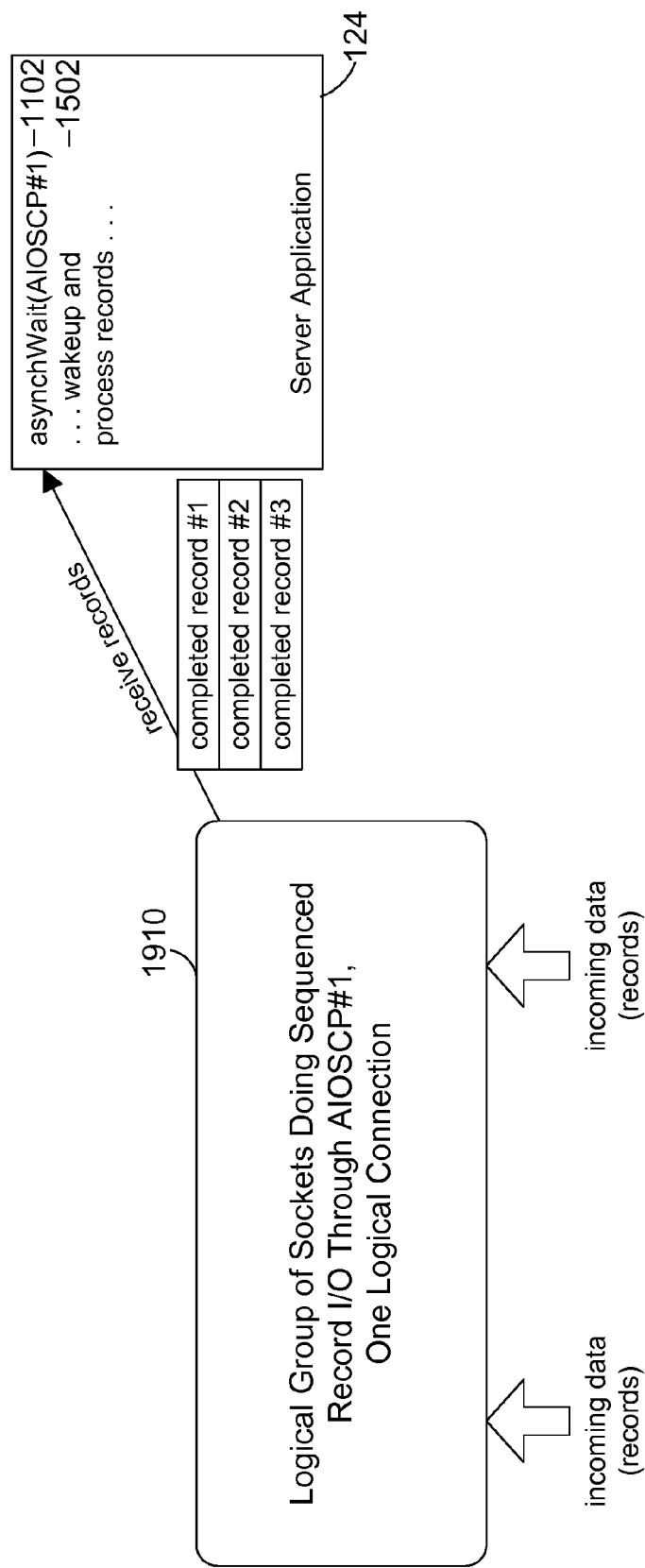
FIG. 19 is a block diagram in accordance with the preferred embodiments that shows communicating between computer systems using multiple sockets on a single logical connection.

FIGS. 9-18 show a system where logical groups of sockets perform sequenced record I/O through AIOSCP 125, when only one logical connection is defined. This is shown in simplified block diagram form in FIG. 19, where block 1910 represents the sockets 129A and 129B, the sorted staging queues 126A and 126B, and the AIOSCP 125 shown in FIGS. 9-18. Thus, FIG. 19 is an alternative representation of the system shown in FIG. 15.

In a different implementation within the scope of the preferred embodiments, logical groups of sockets may do sequenced record I/O through AIOSCP 125 when multiple logical connections are defined. In this scenario, incoming data records include not only a sequence number, but a logical connection number as well (see FIG. 8). Records for different logical connections may be received in any order. Block 2010 represents the AIOSCP, sequenced completion ports, and sockets for a multiple socket, multiple logical connection configuration. Note that the data records incoming to block 2010 are in any order, and block 2010 appropriately sequences and orders these records to provide ordered sequenced blocks of records to server application 124. Thus, we see in FIG. 20 that completed records #1, #2 and #3 for logical connection #1 are transmitted as an ordered group of records, and that completed records #1, #2 and #3 for logical connection #2 are transmitted as an ordered group of records. The preferred embodiments expressly extend to the definition of any suitable number of logical connections across any suitable number of network connections.

Figure 20:
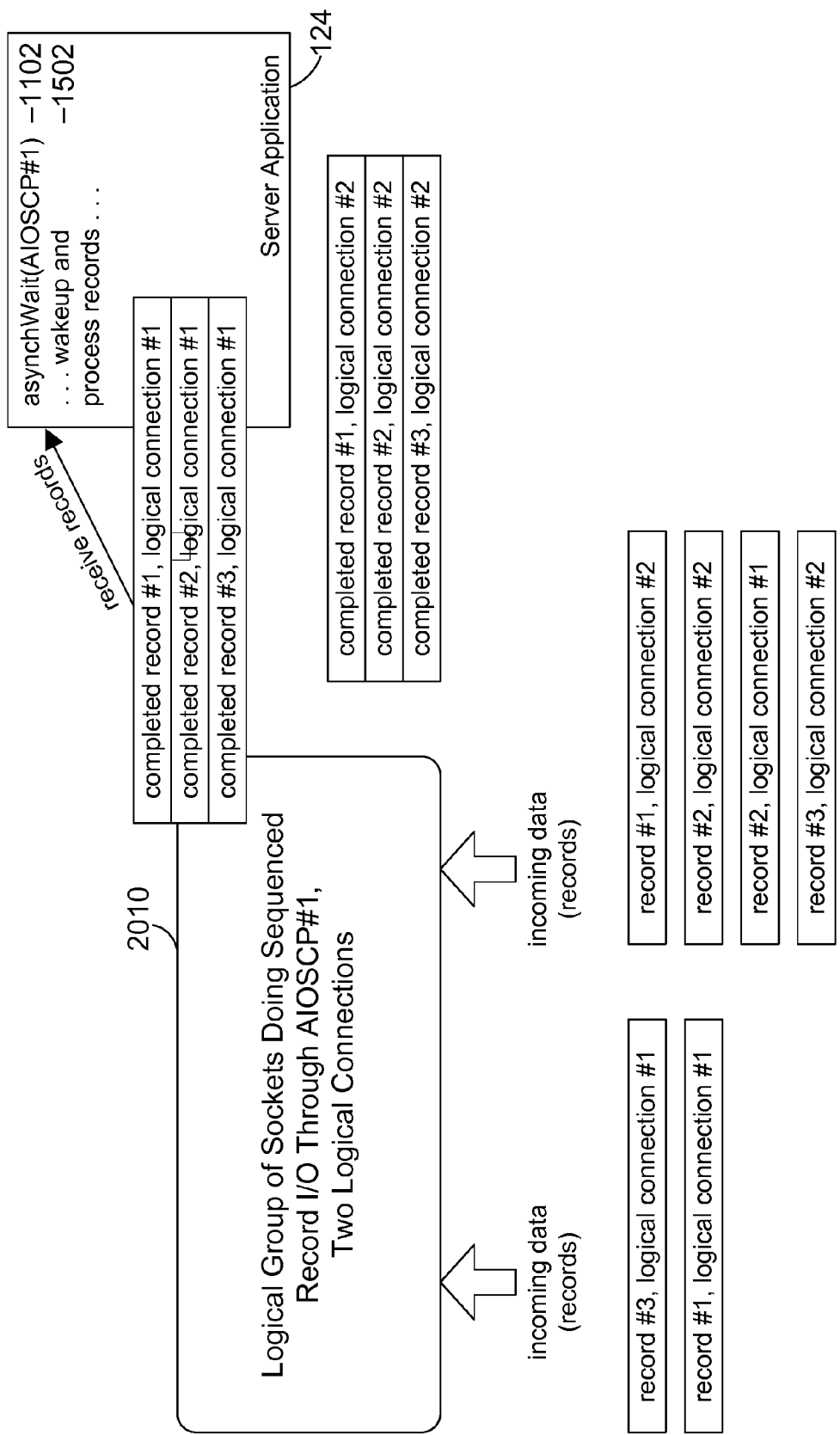
FIG. 20 is a block diagram in accordance with the preferred embodiments that shows communicating between computer systems using multiple sockets on multiple logical connections.
Figure 21:
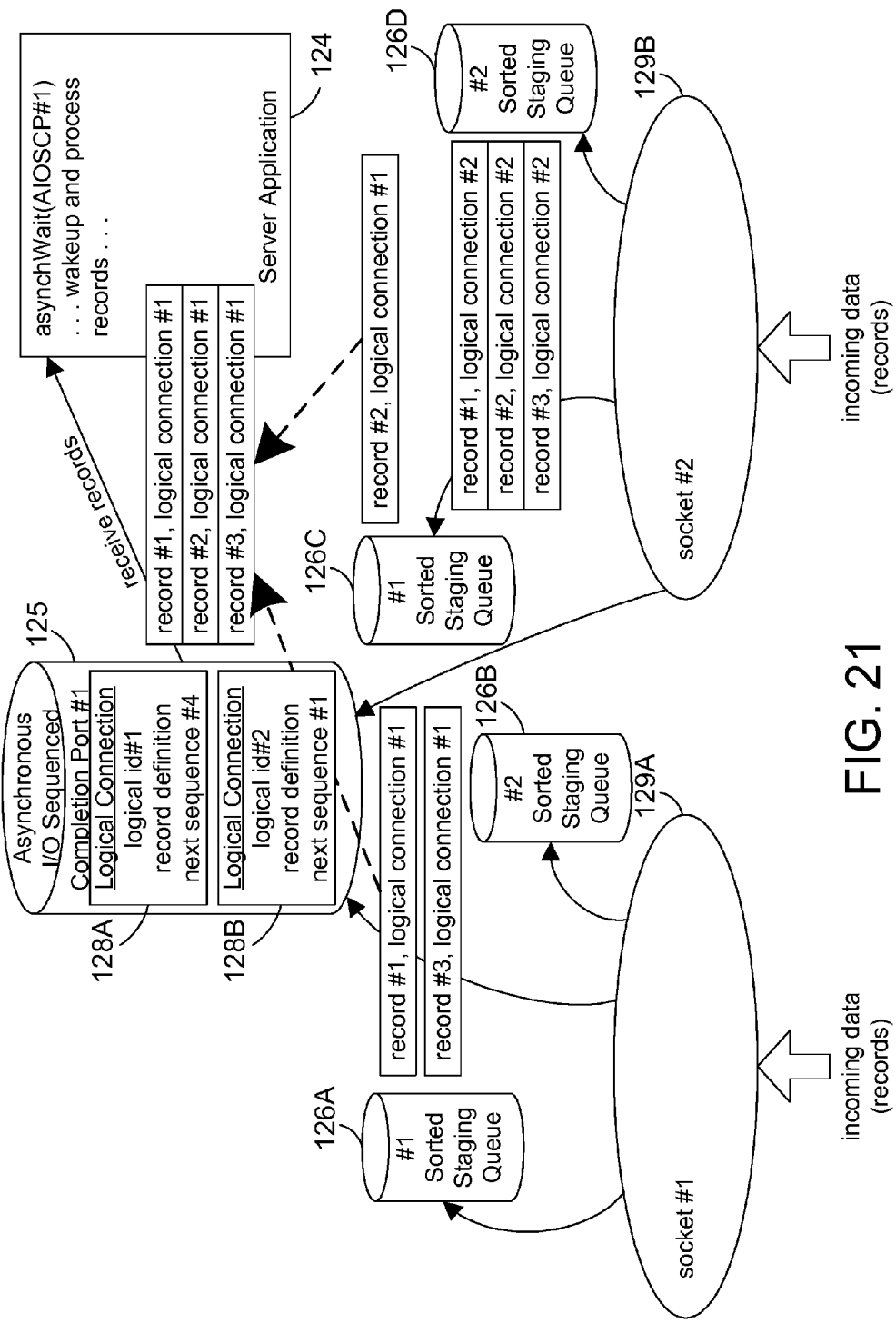
FIG. 21 is a block diagram in accordance with the preferred embodiments that shows the receipt of sequenced records on a first logical connection when multiple logical connections are present.

A specific implementation for block 2010 of FIG. 20 is shown in FIG. 21. We see that socket 129A is defined to be part of two logical connections, and that socket 129B is likewise defined to be part of the same two logical connections. Each logical connection on each socket has its own corresponding sorted staging queue. Thus, logical connection #1 on socket 129A has a corresponding sorted staging queue 126A; logical connection #2 on socket 129A has a corresponding sorted staging queue 126B; logical connection #1 on socket 129B has a corresponding sorted staging queue 126C; and logical connection #2 on socket 129B has a corresponding sorted staging queue 126D. We assume for this example that the data records received by sockets 129A and 129B is as shown in FIG. 20. Record #1 for logical connection #1 is first pulled off of sorted staging queue 126A and written to AIOSCP 125. Record #2 for logical connection #1 is then pulled off of sorted staging queue 126C and written to AIOSCP 125. Record #3 for logical connection #1 is then pulled off of sorted staging queue 126A and written to AIOSCP 125. At this point, the next sequence number for logical connection #1 is record #4, which has not yet been received in this example. The AIOSCP 125 wakes up the server application 124, which receives the ordered and sequenced records #1, #2 and #3 for logical connection #1.

Figure 22:
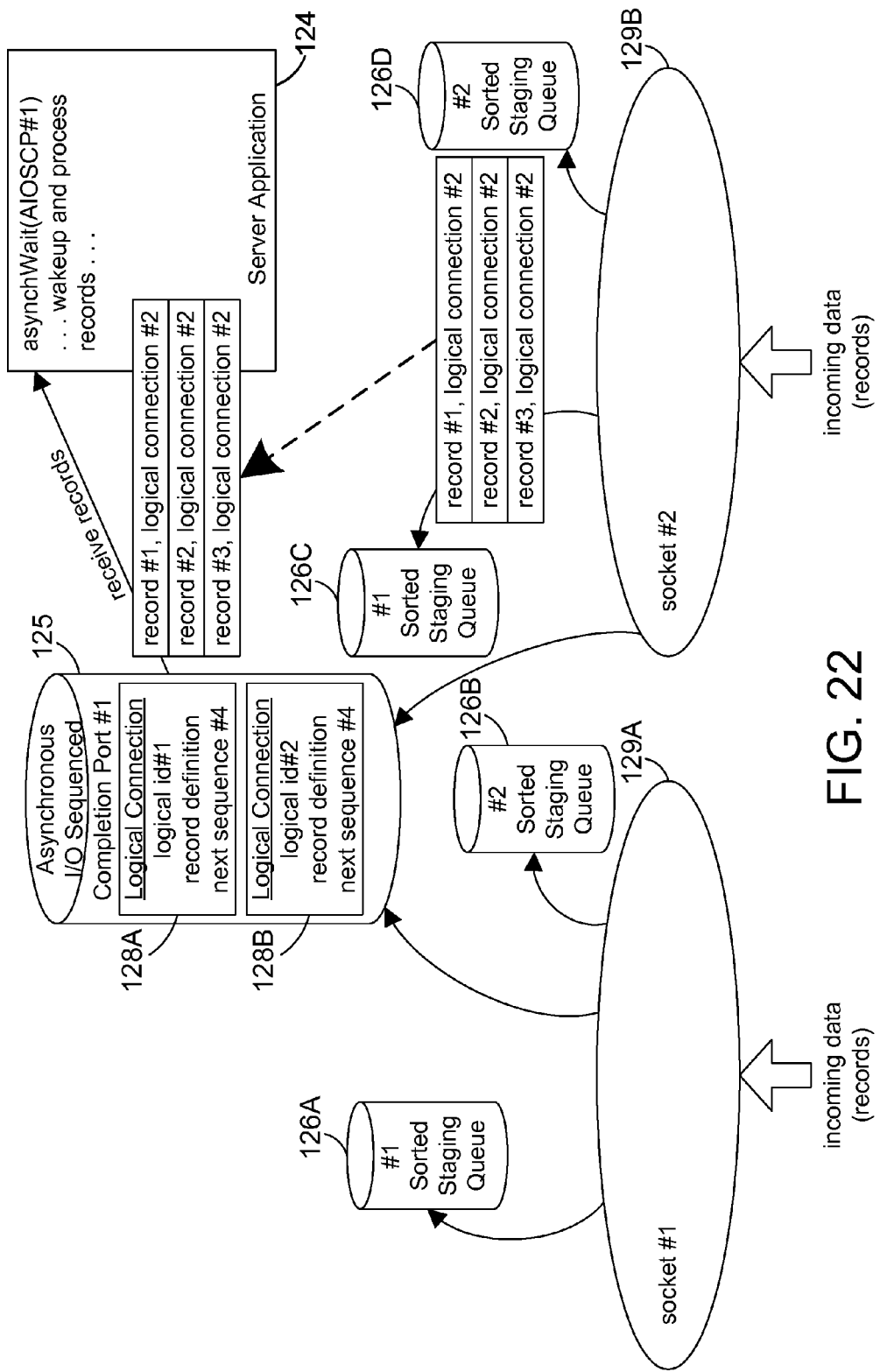
FIG. 22 is a block diagram in accordance with the preferred embodiments that shows the receipt of sequenced records on a second logical connection when multiple logical connections are present.

FIG. 22 shows how AIOSCP 125 orders the sequenced records on sorted staging queue 126D in the appropriate order for logical connection #2, then wakes up the server application 124 and transfers these records to server application 124. The more complex examples of FIGS. 21 and 22 illustrate how the AIOSCP 125 and associated sorted staging queues 126A, 126B, 126C and 126D in FIGS. 21 and 22, may be used to define multiple logical connections over multiple network connections (e.g., sockets). From the simple examples presented herein, one skilled in the art will realize that the principles of the preferred embodiments expressly extend to any suitable number of logical connections over any suitable number of network connections.

Figure 23:
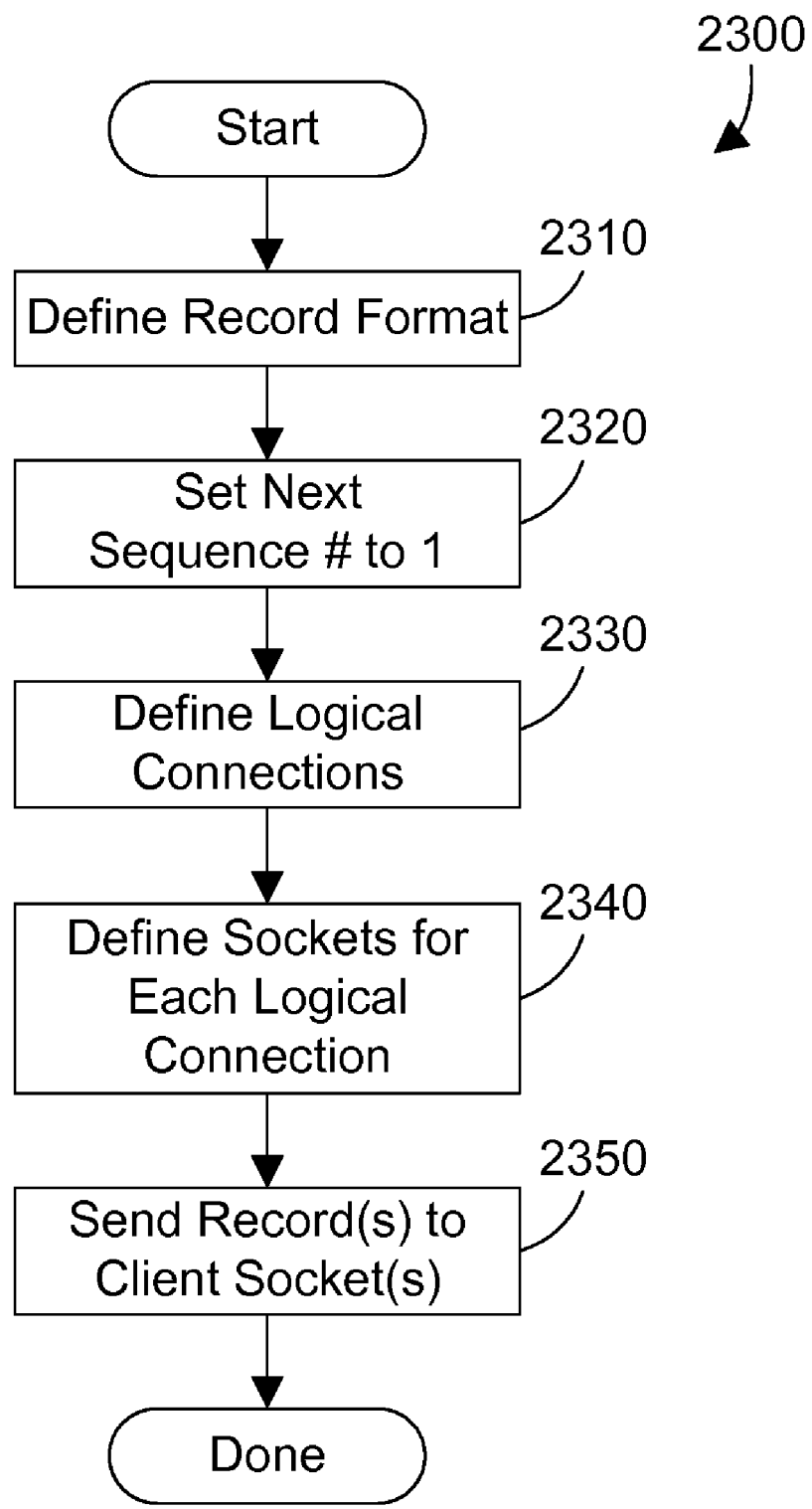
FIG. 23 is a flow diagram of a method for configuring a client application in accordance with the preferred embodiments.

Referring back to FIG. 6, correct operation of system 600 requires that certain steps be performed in system 600. For example, a method 2300 in FIG. 23 include steps that define information that a client application must know to communicate in accordance with the preferred embodiments. This information is suitably coded into each client application (e.g., 610 and 620). In method 2300, the record format must be defined (step 2310). The next sequence number is set to one (step 2320). One or more logical connections are defined, and are assigned corresponding logical IDs (step 2330). One or more sockets are then defined for each logical connection (step 2340). With the information in steps 2310-2340, the client applications 610 and 620 may transmit messages to the client sockets 630, 632, 640 and 642 (step 2350). Note that the information in steps 2310, 2320, 2330, and 2340 is preferably hard-coded into the client applications 610 and 620, or may be communicated to the client applications 610 and 620 in any suitable way. Once configured with the information in steps 2310, 2320, 2330, and 2340, the client applications 610 and 620 add sequenced message headers 710 (see FIG. 8) to records, and determine which records to send to which sockets for which logical connections in step 2350.

Figure 24:
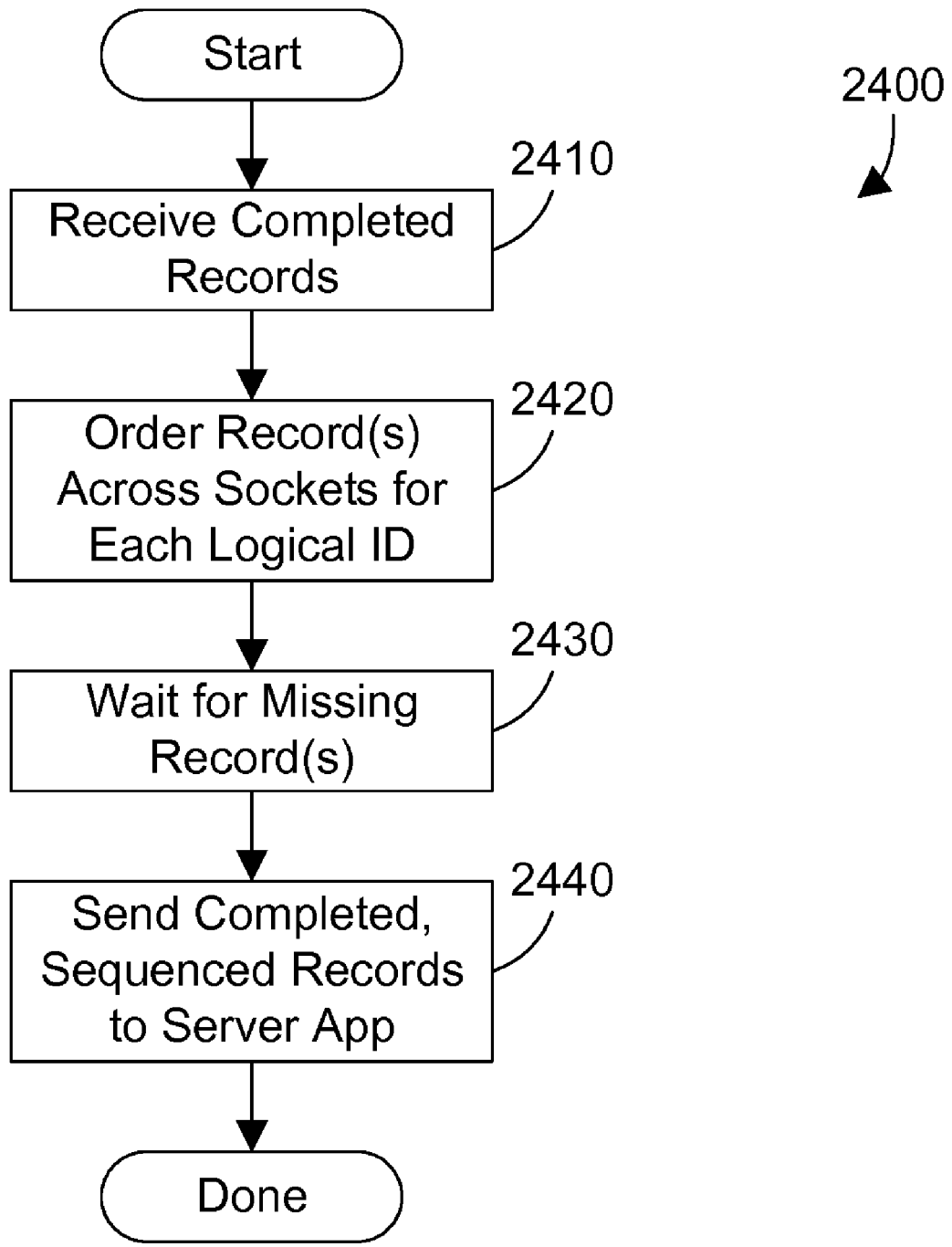
FIG. 24 is a flow diagram of a method in accordance with the preferred embodiments for receiving and processing records by sockets and an asynchronous I/O sequenced completion port.

A method 2400 shown in FIG. 24 represents steps that are preferably performed by AIOSCP 125 in FIG. 6. Sequenced messages (i.e., records that include a sequenced record header 710 of FIG. 8) are assembled by server sockets 650, 652, 660 and 662, and complete records are then received by the sockets and the AIOSCP 125 (step 2410). The records are ordered across sockets for each logical ID (step 2420). AIOSCP 125 then waits for any missing records (step 2430). The completed, sequenced records are then sent to the server application (step 2440).

Figure 25:
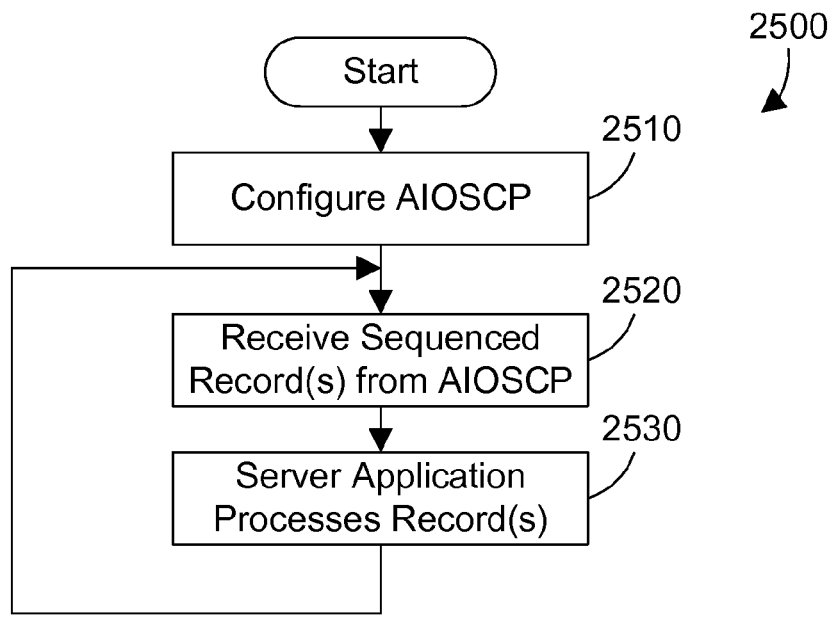
FIG. 25 is a flow diagram of a method in accordance with the preferred embodiments performed by a server application.

Server application 124 preferably performs the steps in method 2500 shown in FIG. 25. One or more AIOSCP (e.g., 125 in FIG. 6) is configured (step 2510). Once an AIOSCP is configured, the server application 124 may receive sequenced messages from the AIOSCP (step 2520). The server application 124 then processes the records (step 2530). The ability to process the records necessarily means that the server application 124 knows that there are multiple logical IDs, and directs received records for a particular logical ID to the proper place. In the preferred embodiment, method 2500 loops back to step 2520 and continues looping until the server application ends.

Figure 26:
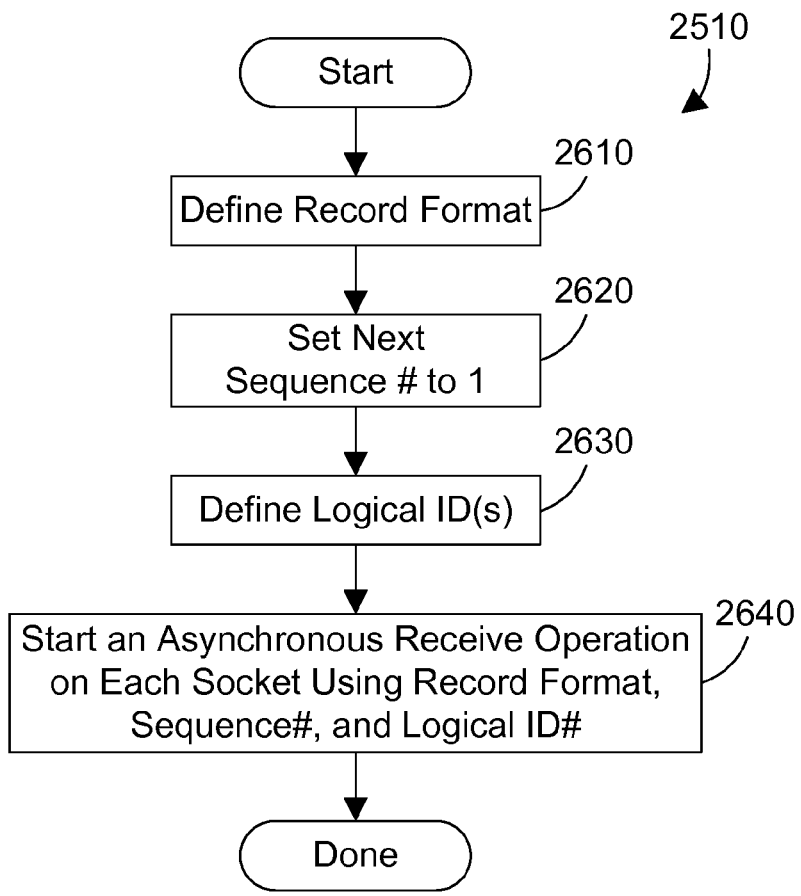
FIG. 26 is a flow diagram of one suitable implementation for step 2510 in FIG. 25.

One suitable implementation of step 2510 in FIG. 25 is shown in FIG. 26. First, the record format is defined in the AIOSCP (step 2610). The next sequence number is set to one (step 2620). One or more logical connections with corresponding logical IDs are defined (step 2630). Finally, an asynchronous receive operation is started on each socket using the record format, sequence number, and logical ID (step 2640). Thus configured using the steps shown in FIG. 26, an AIOSCP 125 is ready to receive sequenced records for one or more logical connections over multiple sockets. Note that one specific implementation of step 2510 in FIGS. 25 and 26 is shown by steps performed by instructions 1002, 1004, 1006, 1008 and 1009.

The preferred embodiments greatly enhance the flexibility and power of network communications between computer systems by defining one or more logical connections that can each include multiple sockets. In this manner a large number of sequenced records can be transferred in parallel and out of order over multiple sockets, with the records being properly ordered on the receiving end before delivering the ordered records to an application that is waiting for the data.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, sockets are shown herein as one specific example of a network connection, but the preferred embodiments expressly extend to any and all types of network connections, whether now known or developed in the future. In addition, the preferred embodiments are illustrated and described herein as transferring data from a client to a server, but this is shown for the purpose of example. The preferred embodiments expressly extend to the transmission and reception of sequenced records between any two computer systems, regardless of their specific designation or function as client computer system or server computer systems.

What is claimed is:

1. An apparatus comprising:
   at least one processor;
   a memory coupled to the at least one processor;
   a software application residing in the memory and executed by the at least one processor;
   a plurality of sockets residing in the memory and executed by the at least one processor, each socket receiving a plurality of messages that each include a sequence number generated by the software application and a logical connection identifier generated by the software application; and
   an asynchronous I/O sequenced completion port residing in the memory and executed by the at least one processor, the asynchronous I/O sequenced completion port defining a plurality of logical connections, wherein at least one of the plurality of logical connections include a plurality of the sockets, the asynchronous I/O sequenced completion port comprising:
   a sorted staging queue corresponding to each logical connection that reads the plurality of messages and that orders the plurality of messages for a corresponding logical connection according to their respective sequence number and logical connection identifier;
   wherein the asynchronous I/O sequenced completion port receives the ordered messages from each sorted staging queue, and delivers the ordered messages to the software application.

2. A computer-readable program product having instructions stored on recordable media, the program product comprising:
   (A) an asynchronous I/O sequenced completion port that defines a plurality of logical connections, wherein at least one of the plurality of logical connections includes a plurality of sockets, each socket receiving a plurality of messages that each include a sequence number generated by a software application and a logical connection identifier generated by the software application, the asynchronous I/O sequenced completion port comprising:
   a sorted staging queue corresponding to each logical connection that reads the plurality of messages and that orders the plurality of messages for a corresponding logical connection according to their respective sequence number and logical connection identifier;
   wherein the asynchronous I/O sequenced completion port receives the ordered messages from each sorted staging queue, and delivers the ordered messages to the software application; and
   (B) the asynchronous I/O sequenced completion port comprising the instructions stored on the recordable media.

\* \* \* \* \*